ELECTRICAL CODING ARRANGEMENTS OF THE KIND FOR PROVIDING AN OUTPUT THAT IS REPRESENTATIVE, ACCORDING TO A DIGITAL CODE, OF THE MAGNITUDE OF AN INPUT VARIABLE

Filed Jan. 26, 1960

INVENTORS
ROBERT HYLTON KIRKNESS
CECIL JOHN WAYMAN
BY Kirschstein, Kirschstein & Ottinger
ATTORNEYS INVENTORS
ROBERT HYLTON KIRKNESS
CECIL JOHN WAYMAN
BY [illegible]
ATTORNEYS July 20, 1965 R. H. KIRKNESS ETAL 3,196,426

ELECTRICAL CODING ARRANGEMENTS OF THE KIND FOR PROVIDING AN OUTPUT THAT IS REPRESENTATIVE, ACCORDING TO A DIGITAL CODE, OF THE MAGNITUDE OF AN INPUT VARIABLE

Filed Jan. 26, 1960 6 Sheets-Sheet 3

INVENTORS
ROBERT HYLTON KIRKNESS
CECIL JOHN WAYMAN
BY
Kirschstein, Kirschstein & Ottinger
ATTORNEYS July 20, 1965 R. H. KIRKNESS ETAL 3,196,426

ELECTRICAL CODING ARRANGEMENTS OF THE KIND FOR PROVIDING AN OUTPUT THAT IS REPRESENTATIVE, ACCORDING TO A DIGITAL CODE, OF THE MAGNITUDE OF AN INPUT VARIABLE

Filed Jan. 26, 1960

6 Sheets-Sheet 4

INVENTORS
Robert Hylton Kirkness
Cecil John Wayman
BY Kirschstein, Kirschstein & Ottinger
ATTORNEYS INVENTORS
ROBERT HYLTON KIRKNESS
CECIL JOHN WAYMAN
BY Kirschstein, Kirschstein & Ottinger
ATTORNEYS INVENTORS
ROBERT HYLTON KIRKNESS
CECIL JOHN WAYMAN
BY Kirschstein, Kirschstein, & Ottinger
ATTORNEYS 3,196,426

ELECTRICAL CODING ARRANGEMENTS OF THE KIND FOR PROVIDING AN OUTPUT THAT IS REPRESENTATIVE, ACCORDING TO A DIGITAL CODE, OF THE MAGNITUDE OF AN INPUT VARIABLE

Robert Hylton Kirkness, Bushey, and Cecil John Wayman, Stanmore, England, assignors to The General Electric Company Limited, London, England Filed Jan. 26, 1960, Ser. No. 4,768
Claims priority, application Great Britain, Jan. 30, 1959, 3,517/59
8 Claims. (Cl. 340—347)

This invention relates to coding arrangements.

The invention is particularly concerned with coding arrangements of the kind for providing in dependence upon a variable an output which is in digital form and which is representative of a number that according to a predetermined code is characteristic of the magnitude of that variable.

In coding arrangements of the kind specified the accuracy to which the magnitude of the variable is represented, owing to the digital nature of the output, is in general dependent upon the number of digits in the output number. This results from the fact that the number of the predetermined code are actually characteristic of respecive ranges of magnitudes of the variable, and the extent of each of these ranges is dependent in general upon the number of digits used. An obvious way to increase the accuracy therefore, is to increase the number of digits in the output number so as to reduce the extent of each range. In normal circumstances however, there is a limit to the number of digits which may be provided.

For example, a coding arrangement of the kind specified is described in the complete specification of British patent application No. 11,280/57, and in this arrangement a coder provides an electrical output representative in digital form of the angular position of a shaft. The number of digits in the number represented by the output from the coder is dependent upon the number of electrical windings provided in that coder, but the number of windings which may be provided depends in turn upon the number of teeth on a ferromagnetic core in that coder. Unfortunately there is a constructional limitation upon the number of teeth which may be provided for a given number of windings and size of coder, and consequently for a given size of coder there is a limit imposed upon the accuracy to which the angular position of the shaft may be represented by that coder.

Thus owing to constructional limitations, it is not normally possible in a coding arrangement of the kind specified, to increase beyond a certain limit the number of digits in the output number in order that the magnitude of the variable shall be represented to a greater degree of accuracy.

It is an object of the present invention to provide a coding arrangement of the kind specified in which this disadvantage is, at least in part, overcome.

According to the present invention, in a coding arrangement of the kind specified, it is arranged that the part of the output which is representative of the least significant digit of the output number is derived in dependence upon two different electric signals each having an amplitude that varies cyclically in dependence upon variation in said magnitude, the different cycles of each such signal corresponding to predetermined different ranges of said magnitude which are each equal in extent to predetermined ranges of variation of the magnitude throughout which, according to said code, there is no change in the second least significant digit of said number.

The variable may be the relative position of a pair of relatively movable members, and the coding arrangement may include an electrical coder which is arranged to provide electric output signals that are dependent upon the relative position of those members.

One example of a coding arrangement in accordance with the present invention, for providing electric output signals which are characteristic of the angular position of a shaft, will now be described with reference to the accompanying drawings, in which.

Figure 1:
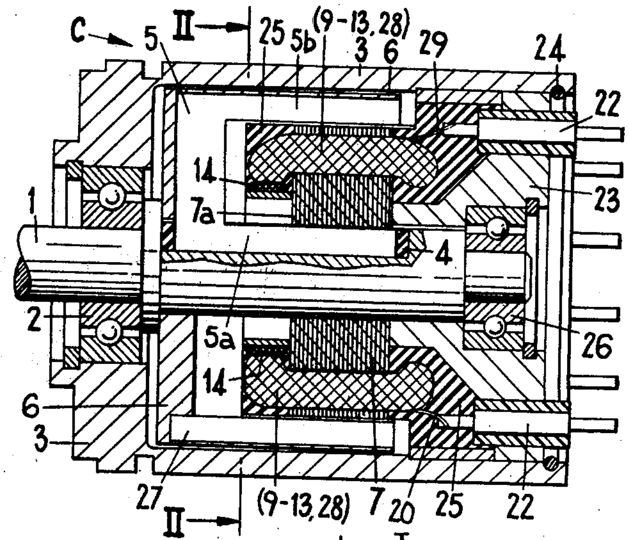
FIGURE 1 is a sectional elevation of a coder used in the coding arrangement.
Figure 3A:
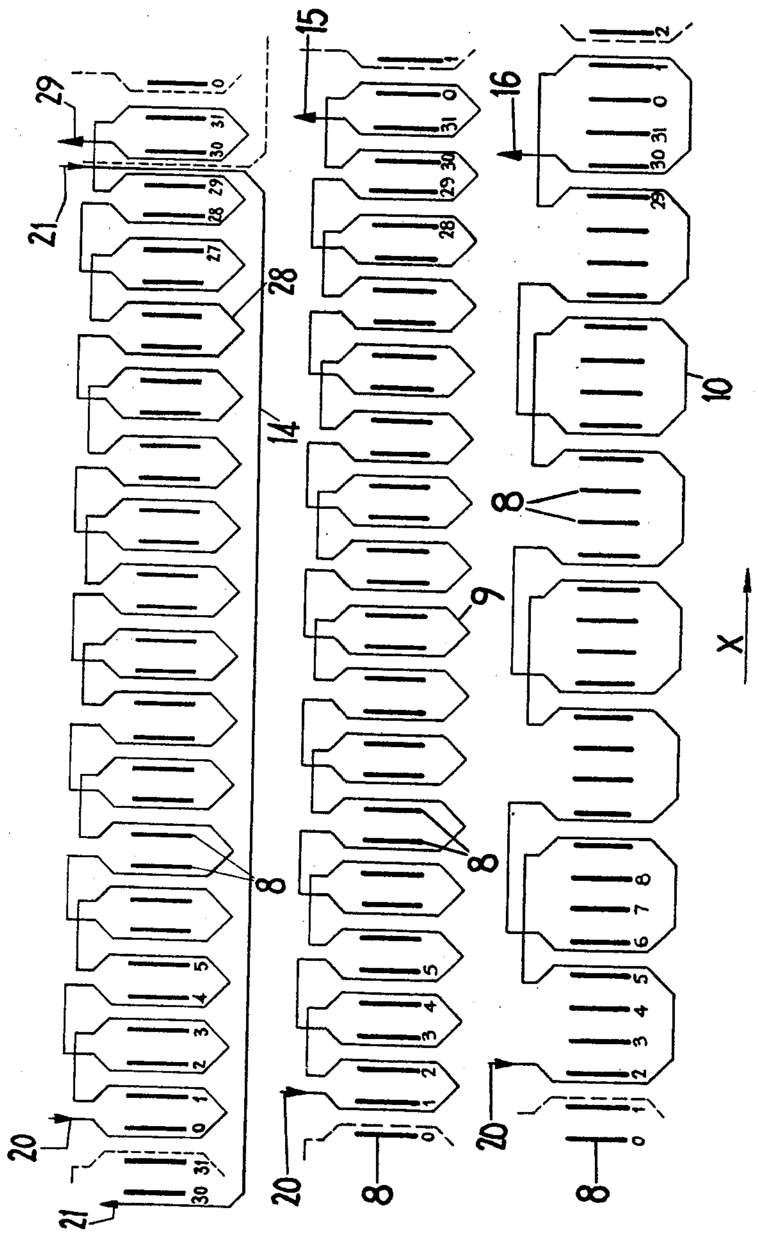
Figure 3B:
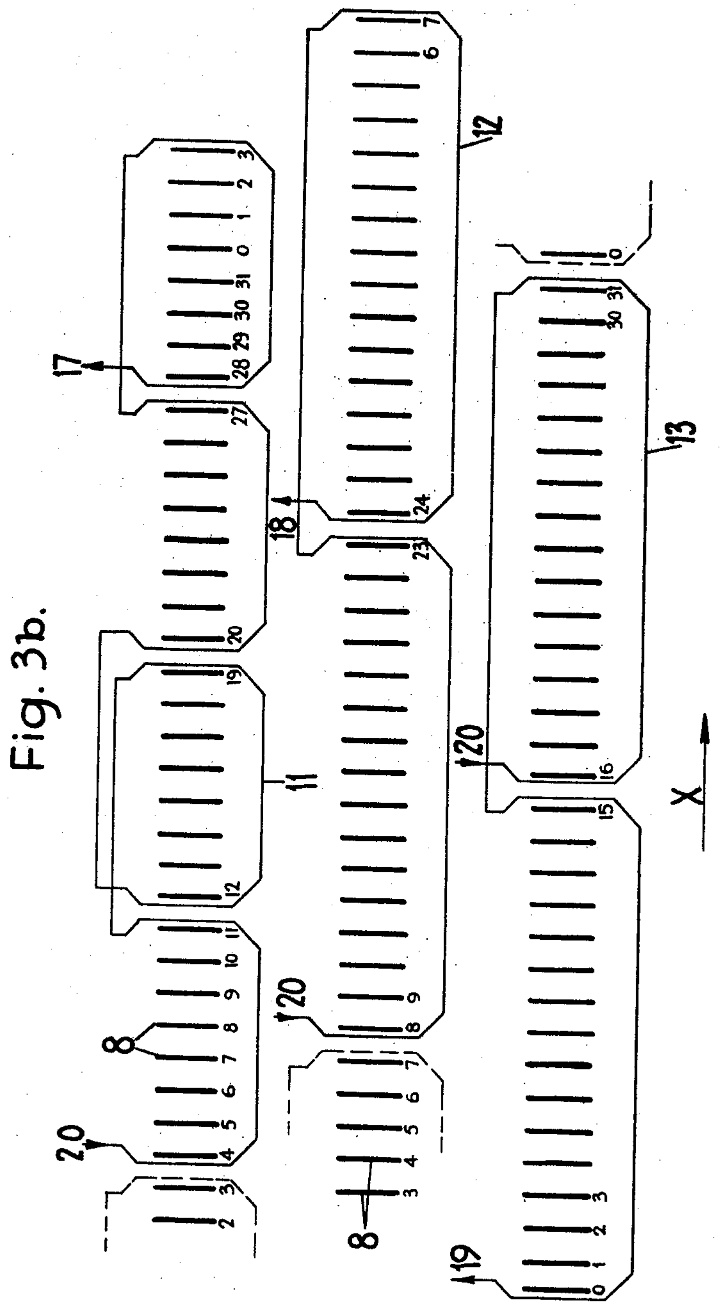
Figure 4:
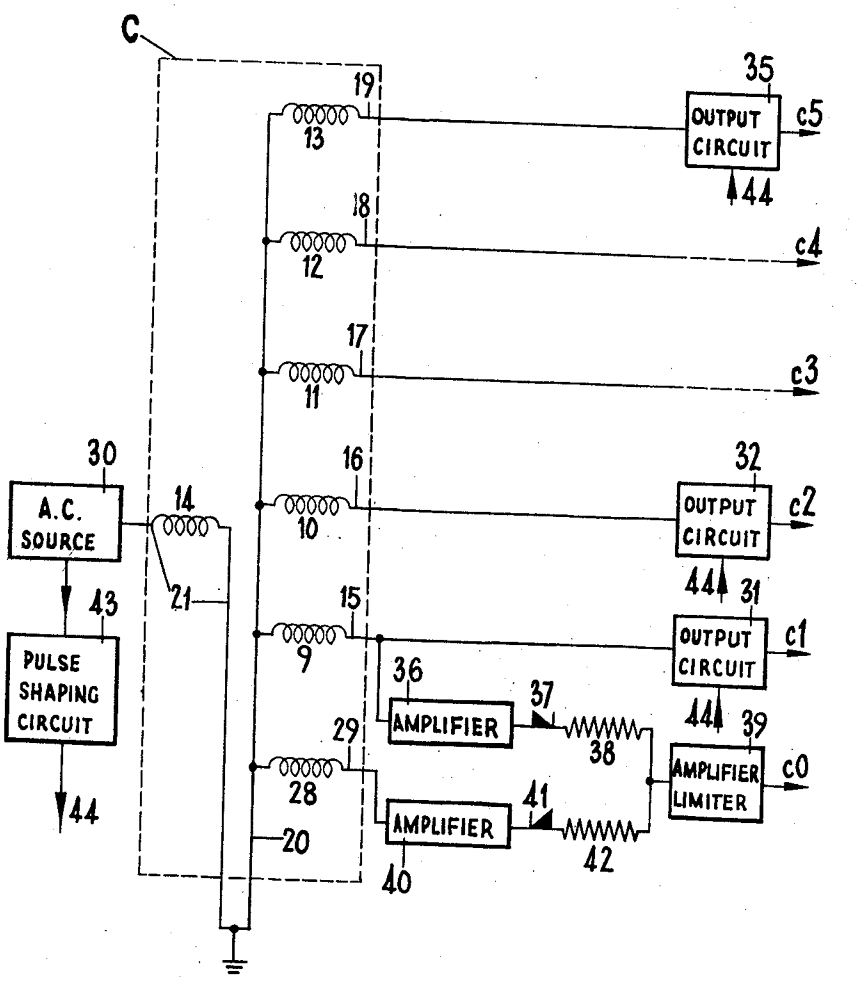
Figure 5:
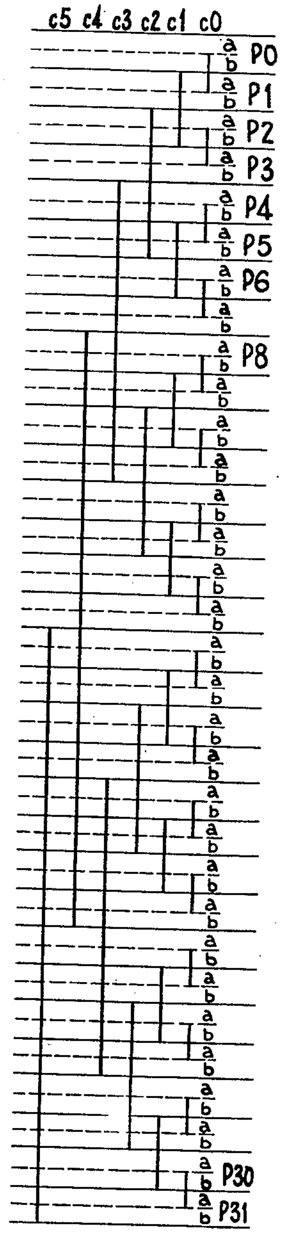
Figure 6:
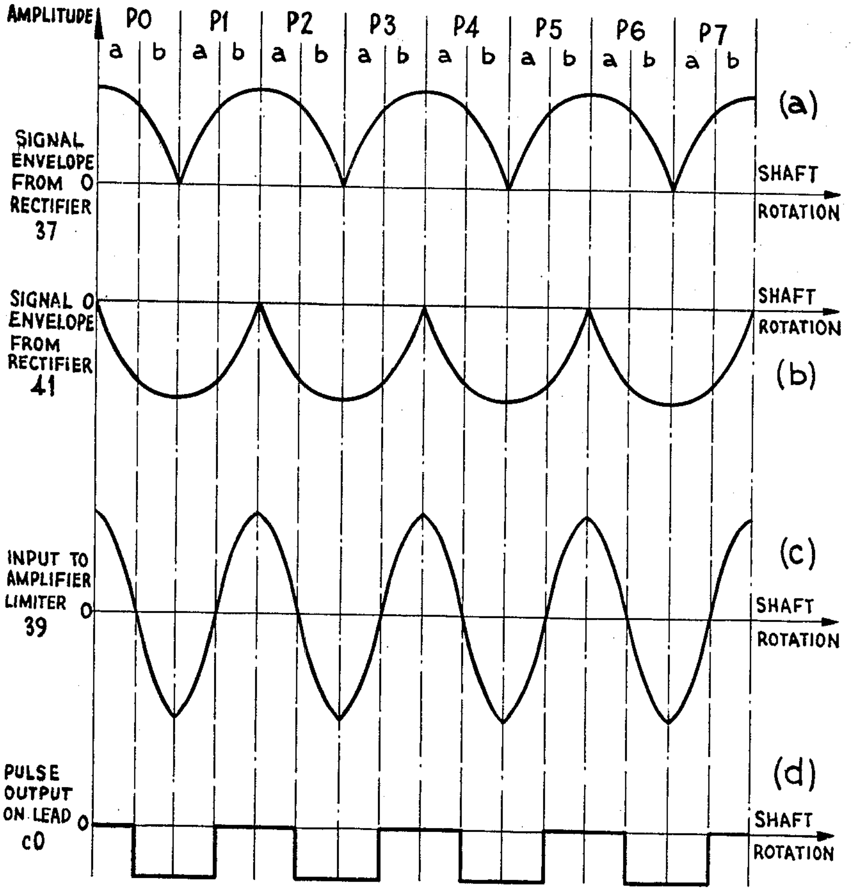

FIGURES 3*a* and 3*b* are diagrammatic representations of the arrangement of electrical windings in the coder shown in FIGURE 1;

FIGURE 4 is a schematic representation of the electrical circuit of the coding arrangement;

FIGURE 5 is a diagrammatic representation of the coding provided by the coding arrangement; and FIGURE 6 is a diagrammatic representation of electrical signal waveforms appearing in the coding arrangement.

Figure 2:
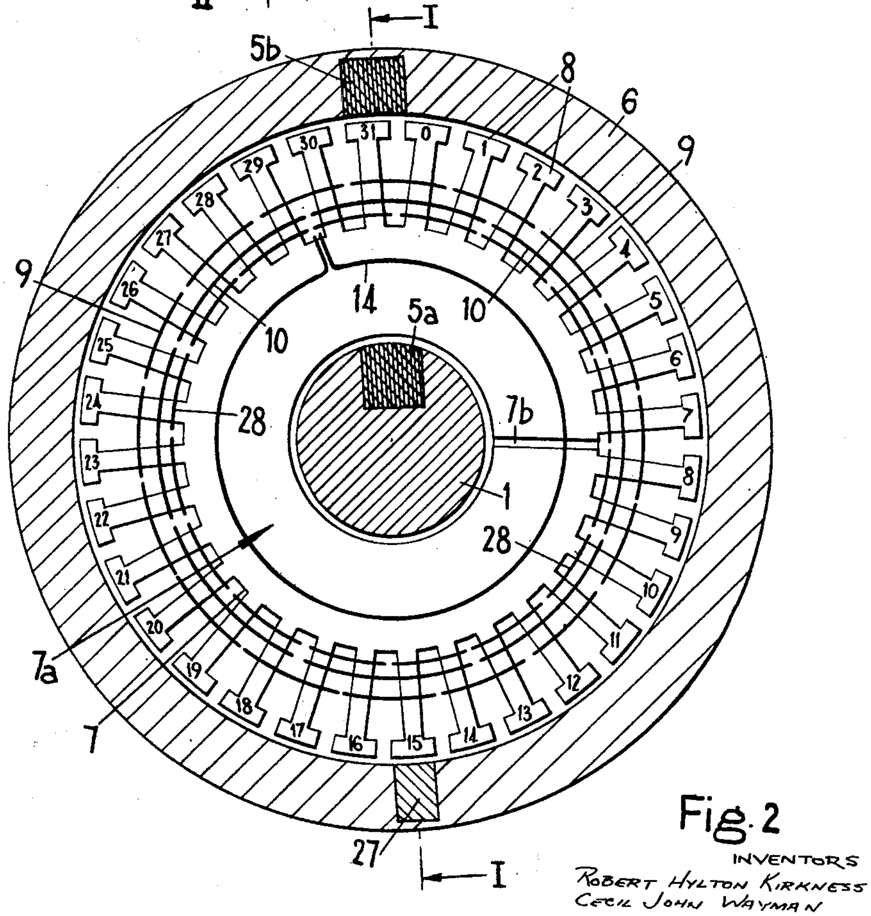
FIGURE 2 is an enlarged diagrammatic representation of a section taken on the line II–II of FIGURE 1, the section of FIGURE 1 being taken on the line I–I of FIGURE 2.

Referring to FIGURES 1 and 2, a coder C having a shaft 1 is adapted to provide six output alternating current signals in dependence upon the angular position of the shaft 1. Five of these output signals are respectively representative, by their phase relationship with an exciting signal applied to the coder in operation, of the five most significant digits of a six digit binary number which, according to a predetermined binary code, is characteristic of the angular position of the shaft 1 within one complete revolution. The sixth output signal and that one of the five output signals which is representative of the second least significant digit of the six digit number, are combined within the arrangement after both of those signals have been rectified. The resulting combined output signal is representative of the least significant digit of the six digit number.

In the coder, the shaft 1 is journalled within a bearing 2 housed in a casing 3. The shaft 1 has a channel 4 therein and one limb 5*a* of a laminated ferromagnetic yoke 5 is secured within this channel. Another limb 5*b*, and the remainder of the yoke 5, are secured within a cylindrical member 6 which rotates with the shaft 1.

A laminated ferromagnetic core 7 is supported within a casing 3, the core 7 having thirty-two teeth 8 (which are numbered 0 to 31 in FIGURE 2). The pitch of the teeth 8 is substantially the same as the thickness of the yoke 5 and the core 7 is composed of seventy laminations. These laminations have respective radial slits 7*b* that are arranged so that throughout the length of the core 7 there is a uniform angular distribution of these slits about the axis of the core.

The five output signals representative of the five most significant digits of the six digit number respectively, appear in operation in five windings 9 to 13 wound on the core 7. The sixth output signal appears in a winding 28 also wound on this core. The windings 9 to 13 and 28 are wound to lie between adjacent ones of the teeth 8, and over the ends of the teeth 8 at an end 7*a* of the core 7. In FIGURE 1 the windings 9 to 13 and 28 have the general reference (9–13, 28) and of these windings only the windings 9, 10 and 28 are actually shown in FIGURE 2.

A winding 14 to which the exciting signal is applied in operation is also associated with the core 7, this winding encircling the shaft 1 at the end 7*a* of the core 7.

Connection is made to the windings 9 to 13 by respective leads 15 to 19 (of which only the lead 15 is shown in FIGURE 1) and a common lead 20, and to the winding 14 by a pair of leads 21 (not shown in FIGURE 1). Similarly, connection is made to the winding 28 by means of a lead 29 (not shown in FIGURE 1) and the common lead 20, the leads 15 to 21 together with the lead 29 being connected within the coder C to nine terminal pins 22 respectively.

The core 7 is supported within the casing 3 by means of an end member 23 which is secured within the casing by a spring clip 24. The core 7 is in actual fact bonded to the end member 23 by a resin 25 (such as one of those sold under the registered trademark "Araldite") within which the core 7 and the member 23 are encased during manufacture. The shaft 1 is journalled within a bearing 26 in the member 23.

A lead weight 27 is secured within the member 6 diametrically opposite the limb 5*b* of the yoke 5, in order to counteract any unbalance of the shaft 1 caused by the unsymmetrical positioning of the yoke 5 within the member 6.

The manner in which the windings 9 to 13 together with the windings 14 and 28 are wound on the core 7 is indicated diagrammatically in FIGURES 3*a* and 3*b* to which reference will now be made. In these figures the teeth 8 are numbered from 0 to 31 in the same manner as in FIGURE 2.

Referring to FIGURES 3*a* and 3*b*, the windings 9 and 28 are wound round different pairs of the teeth 8; the winding 10 is wound round groups of four of the teeth 8; the winding 11 is wound round groups of eight of the teeth 8; and the windings 12 and 13 are wound round different groups of sixteen of the teeth 8. The winding 14, as also indicated in FIGURE 2, is wound round all the teeth 8 together.

It is arranged that the sense in which the windings 9 to 13 and 28 are wound onto the core 7 is alternated. For example, the sense in which the winding 9 is wound round Nos. 1 and 2 of the teeth 8 is opposite to that in which it is wound round Nos. 3 and 4 of the teeth 8, but is the same as that in which it is wound round Nos. 5 and 6 of those teeth. In addition, the sense in which the winding 11 is wound round Nos. 4 to 11 of the teeth 8 is opposite to that in which it is wound round Nos. 12 to 19 of the teeth 8. Further, the sense in which the winding 28 is wound round Nos. 2 and 3 of the teeth 8 is opposite to that in which this winding is wound round Nos. 31 and 0, and Nos. 4 and 5 of the teeth 8.

It will be assumed for the purposes of the present description that the senses in which a winding is wound are "positive" and "negative" where that winding (as represented in FIGURE 3*a* or 3*b*) is wound round teeth 8 in anti-clockwise and clockwise directions respectively. In these circumstances therefore, a winding is wound in the 'positive" sense where the direction in which that winding is wound over the ends of the teeth 8 at the end 7*a* is as indicated by the arrows X, whereas that winding is wound in the "negative" sense where wound in the opposite direction at the end 7*a*. The directions in which the windings are wound are indicated in FIGURES 3*a* and 3*b* by the arrows at the two ends of those respective windings. For example, the winding 9 is wound over Nos. 1 and 2 and Nos. 5 and 6 of the teeth 8 in the positive sense, but in the negative sense over Nos. 3 and 4 of the teeth 8.

Although each of the windings 9 to 14 and 28 is represented in FIGURES 3*a* and 3*b* as a single turn, each of the windings 9 to 13 and 28 in actual fact comprises twenty-five turns, and the winding 14 fifty turns.

The coder C described above with reference to FIGURES 1, 2, 3*a*, and 3*b*, is connected in operation in a circuit arrangement such as will now be described with reference to FIGURE 4.

Referring to FIGURE 4, the alternating current exciting signal, which signal has a frequency of 25 kilocycles per second, is applied to the winding 14 of the coder C, from a source 30.

The lead 20 of the coder C is connected directly to earth, and the leads 15 to 19 are connected to respective ones of five identical output circuits 31 to 35 (of which only the output circuits 31, 32 and 35 connected to the leads 15, 16 and 19, respectively, are shown). The output circuits 31 to 35 have output leads *c*1 to *c*5, respectively.

The signal appearing between the lead 15 and earth, in addition to being applied to the output circuit 31, is applied to an amplifier 36. The amplified signal from the amplifier 36 is applied through a rectifier 37 and a resistor 38 to an amplifier-limiter 39. The amplifier-limiter 39 has an output lead *c*0. The signal appearing between the lead 29 and earth is also applied to the amplifier-limiter 39, this signal being amplified by an amplifier 40, and then applied to the amplifier-limiter 39 through a rectifier 41 and a resistor 42.

The exciting signal applied by the source 30 to the winding 14 is also applied to a pulse shaping circuit 43. The pulse train which is derived from the exciting signal by the circuit 43 is passed over a lead 44 to each of the output circuits 31 to 35 (the actual connection between the circuit 43 and the output circuits 31 to 35 is omitted from FIGURE 4, for clarity). This pulse train is used as a reference signal in each of the output circuits 31 to 35.

As a result of the inductive relationship between the winding 14 and the individual windings 9 to 13 and 28, the application of the exciting signal to the winding 14 from the source 30 causes six alternating current singals to be induced in the windings 9 to 13 and 28 respectively. Each of these signals is either in phase or in anti-phase with the exciting signal in dependence upon the position of the yoke 5 with respect to the core 7 so that at any time the combination of signals that are in a particular one of these two phase-relationships, in-phase and in anti-phase, is representative of the angular position of the shaft 1 at that time.

The signals which appear in the windings 9 to 13 are applied to the respective output circuits 31 to 35, and pulses appear in consequence upon the output leads *c*1 to *c*5 in dependence upon the phase relationships existing between the respectvie input signals and the exciting signal. The pulse train applied to the output circuits 31 to 35 over the lead 44 acts as a reference against which these phase relationships are detected. In the present case it is arranged that a pulse appears on any one of the output leads *c*1 to *c*5 only if the induced signal in the respective one of the windings 9 to 13 is in-phase with the exciting signal. No pulse appears on this lead if the induced signal is in anti-phase with the exciting signal. The windings 9 to 13 are arranged so that the particular combination of leads *c*1 to *c*5 upon which pulses appear at any one time is characteristic of the position of the shaft 1 within thirty-two angular ranges of 11.25 degrees, there being thirty-two different combinations for one revolution of the shaft 1.

The alternating current signals which are induced in the windings 9 and 28 cause direct currents to flow in the two resistors 38 and 42 respectively. The amplifier-limiter 39 is responsive to the unidirectional voltages which appear in consequence across the two resistors 38 and 42, to apply a pulse to the output lead *c*0 only while the sum of those two voltages is negative.

For one revolution of the shaft 1 the individual phase relationships between the two signals appearing in the windings 9 and 28 and the exciting signal, change sixteen times. However due to the arrangement of the windings 9 and 28, the changes in the two individual phase-relationships do not occur together during the revolution but are separated by 11.25 degrees of shaft rotation. In consequence of this the sum of the two unidirectional voltages appearing across the resistors 38 and 42 changes sign thirty-two times during each revolution, one of these changes in sign taking place half-way through each of the above-mentioned thirty-two angular ranges of 11.25 degrees. Hence a pulse appears on the output lead $c0$ throughout only half of each of these thirty-two angular ranges. The presence or absence of a pulse on this output lead $c0$ therefore indicates in which half of one of these thirty-two ranges the shaft 1 then lies.

In this manner the combination of the leads $c0$ to $c5$ upon which pulses appear is characteristic of the angular position of the shaft 1 within sixty-four angular ranges of 5.625 degrees, the additional information provided by the presence or absence of a pulse upon the single lead $c0$, doubling the accuracy to which this angular position is indicated by pulses on the leads $c1$ to $c5$ alone.

The operation of the coder C within the coding arrangement described above, will now be explained in greater detail.

Neglecting, for the present, the effect of the yoke 5 upon the operation of the coder C, the application of the exciting signal to the winding 14 causes alternating currents to be induced in each of the windings 9 to 13 and 28 due to normal inductive coupling between each of those windings and the winding 14 at the end *7a* of the core 7. However, as described above the sense of each of the windings 9 to 13 and 28 alternates round the end *7a* of the core 7, and there are an equal number of portions thereof which are coupled in each of the two senses to the winding 14. As a result the alternating currents induced in each of the windings 9 to 13 and 28 in one sense, are effectively cancelled out by the alternating currents induced therein in the opposite sense, so that no voltage signal is developed between the common lead 20 and any of the leads 15 to 19 and 29.

The yoke 5 is shown in FIGURES 1 and 2 in a position relative to the core 7 in which the limb *5b* lies over No. 31 of the teeth 8, and in this position therefore, the yoke 5 completes a magnetic circuit linking each of the windings 9 to 13 and 28 to the winding 14 where the windings 9 to 13 and 28 pass over the end of No. 31 of the teeth 8 at the end *7a* of the core 7. This magnetic circuit passes from the limb *5a* to the limb *5b* in the yoke 5, and from the limb *5b* to the limb *5a* through that part of the laminated core 7 which lies interposed, in this position, between the limbs *5a* and *5b*. As a result therefore, the magnitude of the inductive coupling between the winding 14 and each of the windings 9 to 13 and 28, where these windings are linked by the yoke 5, is much greater than is the case for the normal inductive coupling between those windings when not so linked. Since the winding 14 and the windings 9 to 13 and 28, are only linked by the yoke 5 in the one position, that is, where the windings 9 to 13 and 28 lie over the end of No. 31 of the teeth 8, there is increased coupling between the winding 14 and each of the windings 9 to 13 and 28 at this one position only. As a result, alternating voltage signals appear between the common lead 20 and each of the leads 15 to 29, these signals being due solely to the additional inductive coupling between the winding 14 and the windings 9 to 13 and 28, where these windings are linked by the yoke 5.

The voltage signals appearing on the individual leads 15 to 19 and 29 are in-phase or in anti-phase with the alternating current exciting signal according to the senses of the windings 9 to 13 and 28 where these are linked by the yoke 5.

It will be appreciated from FIGURES *3a* and *3b* that where the windings 9 to 13 and 28 are linked by the yoke 5 (as shown in FIGURES 1 and 2) the windings 9 to 12 and 28 are each wound in the negative sense and the winding 13 is wound in the positive sense. Hence, the alternating voltage signals appearing on the individual leads 15 to 18 and 29 are in anti-phase with the exciting signal, whereas the alternating voltage signal appearing on the lead 19 is in-phase with the exciting signal. The manner in which the windings 9 to 13 are wound over the teeth

8 on the core 7 is such that there is a unique combination of such "in-phase" and "in anti-phase" signals between the leads 15 to 19 for any position of the shaft 1 relative to the casing 3. With the present arrangement of windings the sense of only one of the windings 9 to 13 changes between adjacent teeth 8, so that the phase of only one of the output signals on the leads 15 to 19 changes for movement of the yoke 5 between these teeth.

Since there is a change in sense of one of the windings 9 to 13 between any adjacent pair of teeth 8, the yoke 5 when positioned to lie between those two teeth links that particular winding to the winding 14 in both senses. For example, in the case of the angular position of the shaft 1 shown in FIGURES 1 and 2, the limb *5b* lies partly between Nos. 31 and 0 of the teeth 8, so that in this position the limb *5b* links each of the windings 9 to 13 to the winding 14 not only where these windings pass over the end of No. 31 of the teeth 8 at the end *7a*, but also to a certain extent, where these windings pass over the end of No. 0 of the teeth 8. However, it is only for the winding 13 that there is a change in sense between Nos. 31 and 0 of the teeth 8. As a result the winding 13 is coupled to the winding 14 in each of two senses by the yoke 5, whereas the windings 9 to 12 are each coupled to the winding 14 in only one sense by that yoke.

The resultant signal induced in the winding 13 is either an "in-phase" signal or an "in anti-phase" signal depending upon the exact position of the yoke 5 in relation to Nos. 31 and 0 of the teeth 8. This resultant signal is of course the algebraic sum of the signals induced in the winding 13 from the portions of that winding which are wound in opposite senses around Nos. 31 and 0 of the teeth 8. It is apparent that in the case of the actual position of the shaft 1 shown in FIGURES 1 and 2, the magnitude of the inductive coupling between the winding 13 and the winding 14 is greater for that portion of this winding which is wound in the positive sense over the end of No. 31 of the teeth 8, than for that portion which is wound in the negative sense over the end of No. 0 of the teeth 8. Thus the resultant signal appearing between the lead 19 and the lead 20 is in this case an "in-phase" signal.

In general there is always a signal in each of the windings 9 to 13, the particular combination of "in-phase" and "in anti-phase" signals in these windings indicating the angular position of the shaft 1. There is of course one exception to this general proposition, this being when the limb *5b* is positioned exactly symmetrically between two adjacent teeth 8. In these circumstances there is no resultant signal in the winding which changes sense between those teeth; however these circumstances do not affect the accuracy of the apparatus since the non-existence of a signal in that winding may be quite accurately interpreted either as an "in-phase" signal or an "in anti-phase" signal, since this position of the limb *5b* is the position for which there is ordinarily a transition from one to the other of those "phases."

In operation therefore, the particular combination of the output leads $c1$ to $c5$ upon which pulses appear is dependent upon, and consequently characteristic of, the angular position of the shaft 1. The appearance of a pulse on any one of the five output leads $c1$ to $c5$ may be taken as representing the binary digit "1," and the absence of such a pulse the binary digit "0," so that these different combinations are expressed as different five digit binary numbers in a five digit binary code.

For example in the case of the angular position of the shaft 1 shown in FIGURES 1 and 2, a pulse appears on the output lead $c5$ but not on any of the output leads $c1$ to $c4$. Thus the binary number representing this position of the shaft is:

$$10000$$

the binary digits being arranged here (and also hereinafter) such that reading from left to right, those digits represent the presence ("1") or absence ("0"), as the case may be, of pulses on the leads $c5$ to $c1$ taken in that order.

If the shaft 1 is rotated to the position in which the yoke 5 links the winding 14 to the windings 9 to 13, where these latter windings pass over the end of No. 19 of the teeth 8 at the end $7a$, the corresponding binary number representative of the position of the shaft 1 is now:

11010

With the arrangement of the windings 9 to 13 as shown in FIGURES $3a$ and $3b$ the five digit binary code is a reflected binary cyclic permuted code. Such a code has the advantage that the binary numbers representative of adjacent "digital" positions of the shaft 1 differ only in the digit of one digital place.

A "digital" position of the shaft 1 may be defined as the small angular range of position of the shaft 1, of which a single unique binary number (in this case of five digits) is representative. In the present case there are thirty-two such "digital" positions, P0 to P31 say. These "digital" positions P0 to P31 (which are not indicated in the drawings) each extend over a range of 5.625 degrees of rotation of the shaft 1 on either side of the angular position for which the limb $5b$ is situated symmetrically over the corresponding one of Nos. 0 to 31 of the teeth 8. For example, the shaft 1 is in the "digital" position P31 when situated as shown in FIGURES 1 and 2, the binary number represented by the pulses appearing on the leads $c1$ to $c5$ in this case being the same as if the limb $5b$ was situated exactly symmetrically over No. 31 of the teeth 8, or in any other position within a range of 11.25 degrees centred on that symmetrical position.

The actual coding provided by the arrangement of the windings 9 to 13 as described above with reference to FIGURES 3($a$) and 3($b$), is illustrated in FIGURE 5. In FIGURE 5 the pulse signals which appear on the output leads $c1$ to $c5$ are illustrated for one complete revolution of the shaft 1 through the thirty-two digital positions P0 to P31. In FIGURE 5 the presence of a pulse is represented by a full line, and the pulse sequences which appear on the respective leads $c1$ to $c5$ for one complete revolution of the shaft 1 are arranged in separate columns against the corresponding digital positions P0 to P31.

The coding of the position of the shaft 1 provided by the pulses appearing on the output leads $c1$ to $c5$ of course only indicates the position of the shaft 1 as being within one of the digital positions P0 to P31, that is, as being somewhere within the angular range of 11.25 degrees centred on a particular one of the teeth 8. The position of the shaft 1 within one complete revolution is therefore indicated by these pulses to within 11.25 degrees.

The accuracy of the indication of the position of the shaft 1 is directly dependent upon the number of digital positions provided within one complete revolution of the shaft 1. An obvious way to increase this accuracy therefore, is to increase the number of digital positions and thereby reduce the angular range within which the shaft 1 may in fact lie for any one particular indication. To double the accuracy of the indication which is obtained with the windings 9 to 13 it is necessary to divide each of the digital positions P0 to P31 into two halves, $a$ and $b$ say, so that there are sixty-four digital positions P0$a$, P0$b$, P1$a$ . . . P31$b$, and arrange that a further output pulse signal is obtained to differentiate between positions of the shaft 1 in the different halves $a$ and $b$ of each such digital position. In the present case, in order to preserve the cyclic permuted form of coding, the additional pulse signal is required to be as shown in column $c0$ of FIGURE 5.

If the basic principles underlying the operation of the coder C are applied directly to obtaining the additional pulse signal from the coder C it is necessary to double the number of teeth 8 in that coder and provide a winding additional to the windings 9 to 13 wound round pairs of the resulting sixty-four teeth. Sixty-four teeth are required in the coder in these circumstances so that the additional winding, from which the pulse signal of column $c0$ is to be obtained, may be wound to change sense half-way through each of the original digital positions P0 to P31.

The requirement to double the number of teeth in the coder C is of course a disadvantage since there is normally a limit to the number of teeth which may be provided for a given number of windings and size of coder. This disadvantage is overcome (in accordance with the present invention) in the coder C by the provision of the winding 28 arranged as described above with reference to FIGURES $3a$ and 4.

The manner in which the required pulse signals shown in column $c0$ of FIGURE 5 are obtained on the corresponding lead of FIGURE 4, will not be described in detail, reference being made in this description to FIGURE 6.

The peak-to-peak amplitude of the alternating current applied for the winding 9 to the amplifier 36 varies from zero to a maximum and back to zero again for rotation of the shaft 1 through each of the pairs of digital positions P1 and P2, P3 and P4, P5 and P6 . . . P31 and P0 (see the arrangement of the winding 9 shown in FIGURE $3a$). Thus the envelope of the signal applied from the rectifier 37 to appear across the resistor 38, rises from zero to a maximum positive value and then falls to zero again for rotation of the shaft 1 through each of these pairs of digital positions. This variation in the envelope of the signal applied to appear across the resistor 38 is indicated at ($a$) in FIGURE 6.

Similarly the peak-to-peak amplitude of the alternating current applied from the winding 28 to the amplifier 40 varies from zero to a maximum and back to zero again for rotation of the shaft 1 through pairs of digital positions. However these pair of digital positions differ from those which apply for the winding 9 owing to the different arrangement of the winding 28 upon the core 7, as indicated in FIGURE $3a$. The particular pairs of digital positions which apply in this case are the pairs P0 and P1, P2 and P3, P4 and P5 . . . P30 and P31. The envelope of this signal applied from the rectifier 41 to appear across the resistor 42, therefore falls from zero to a maximum negative value and then rises to zero again for rotation of the shaft 1 through each of these pairs of digital positions. This variation in the envelope of the signal applied across the resistor 42 is indicated at ($b$) in FIGURE 6.

The amplifier-limiter 39 is a high gain D.C. amplifier, and as far as this amplifier is concerned its input is simply the sum of the D.C. components of the signals then appearing across the resistors 38 and 42. Thus the effective combined input to the amplifier-limiter 39 varies in amplitude between positive and negative maxima for rotation of the shaft 1 through each digital position P0 to P31 as indicated at ($c$) in FIGURE 6. This variation in amplitude is such that the combined input is positive for rotation of the shaft 1 throughout each of the pairs of digital positions P1$b$ and P2$a$, and P3$b$ and P4$a$, P5$b$ and P6$a$ . . . P31$b$ and P0$a$, and negative for rotation of the that shaft throughout each of the pairs of digital positions P0$b$ and P1$a$, and P2$b$ and P3$a$, P4$b$ and P5$a$ . . . P30$b$ and P31$a$.

The high gain D.C. amplifier forming the amplifier-limiter 39 amplifies and limits this combined input so that the output applied to the lead $c0$ is negative with respect to earth while the effective combined input is negative. Hence for rotation of the shaft 1 through the digital positions P0 to P31 a negative-going pulse appears on the lead $c0$ (as indicated at ($d$) in FIGURE 6) while the shaft 1 is positioned within any of the pairs of digital positions P0$b$ and P1$a$, and P2$b$ and P3$a$, P4$b$ and P5$a$ . . . P30$b$ and P31$a$. The lead $c0$ is at earth potential for any position of the shaft 1 outside these latter pairs of digital positions.

Thus the required pulse signals shown in the column headed $c0$ of FIGURE 5, are obtained on the lead $c0$ as a result of the combination of the two signals appearing in the windings 9 and 28. The coding arrangement shown in FIGURE 4 thereby provides a six digit coding (as shown in FIGURE 5) of the position of the shaft 1 within one complete revolution, so that the position of the shaft 1 is indicated by the pulses appearing on the leads $c0$ to $c5$ to within 5.625 degrees of rotation.

For example, the binary number representing the position of the shaft 1 when this shaft is positioned within the digital position P31$b$ (as shown in FIGURES 1 and 2) is:

100001 but is:

100000 when in the digital position P31$a$.

It is possible to obtain a further digit from the combined input to the amplifier-limiter 39 so that the angular position of the shaft 1 may be determined to double the accuracy obtained with the coding arrangement described above with reference to FIGURE 4. This further digit is obtained by applying the signal represented at ($c$) together with its inverse to a rectifier circuit (not shown) which acts to select at any one time that one of these signals which is positive, and to apply the resultant signal to an amplitude limiter. This resultant signal from the rectifier circuit is, of course, always positive but alternates in amplitude between zero and a maximum positive value with rotation of the shaft 1, at twice the rate of the signal shown at ($c$) in FIGURE 6. The amplitude limiter to which this signal is applied is so biased that it provides an output only when the signal applied thereto from the rectifier circuit is at, or above, a voltage level corresponding to the required change-over points of the further digit.

The successful use of this further digit to indicate the position of the shaft 1 is dependent upon the accuracy to which the digital positions P0 to P31 are defined by the windings in the coder C.

The output pulse signal which appears upon the lead $c0$ with the particular arrangement shown in FIGURE 4, may be derived in other ways from the two signals induced in the windings 9 and 28. For example these two induced signals may be applied together to two amplifiers (not shown) which produce output signals that are the sum and difference respectively of those two signals. The sum and difference signals are applied to respective phase-conscious rectifier circuits which apply output pulses to different inputs of a common not-equivalent gate in dependence upon the phase relationship which exists between those respective sum and difference signals and the exciting signal. With this alternative arrangement the required pulse signal appears at the output of this not-equivalent gate.

We claim:

1. An electrical coding arrangement comprising: a primary winding for excitation by an electric signal having an amplitude that varies with time; a multiplicity of ferromagnetic poles; first and second secondary windings that are each wound to embrace the poles in pairs and to embrace the poles of consecutive pairs in opposite senses, the pairings of the poles for said first and second secondary windings being different; a ferromagnetic coupling member that is mounted for movement from one to another of the poles to enhance the inductive coupling between the primary winding and the secondary windings at those poles in turn; and means responsive to signals induced in said first and second secondary windings respectively to supply an output signal which has an amplitude that is dependent upon whichever of the two induced signals has the larger amplitude.

2. An electrical coding arrangement comprising: a primary winding for excitation by an electric signal having an amplitude that varies with time; a multiplicity of ferromagnetic poles; three secondary windings that are wound to embrace the poles so that at each pole there is a unique combination of the secondary windings which embrace that pole in a predetermined sense, each of a first and a second of the secondary windings embracing the poles in pairs and embracing the poles of consecutive pairs in opposite senses, and the pairings of the poles for said first and second secondary windings being different; a ferromagnetic coupling member that is mounted for movement from one to another of the poles to enhance the inductive coupling between the primary winding and the secondary windings at those poles in turn; means responsive to signals induced in said first and second secondary windings respectively to supply an output signal which has an amplitude that is dependent upon whichever of the two induced signals has the larger amplitude; and means connected to the second and third secondary windings to supply two further output signals which have amplitudes that are dependent upon whichever of two phase relationships, in-phase and in anti-phase, exists between the excitation signal and signals induced in the first and second windings respectively.

3. A coding arrangement according to claim 2 wherein the means that is responsive to the induced signals in the first and second secondary windings comprises two rectifiers connected to said two secondary windings respectively to rectify the induced signals in opposite senses, and means responsive to direct current signals derived by the two rectifiers to supply an output signal which has an amplitude that is dependent upon the sum of the amplitudes of the two direct current signals.

4. A coding arrangement according to claim 3 wherein the means responsive to the direct current signals is a high-gain direct current amplifier.

5. An electrical coding arrangement for supplying N binary-coded output signals that are together representative of the relative position of a pair of relatively movable members, where N is an integer larger than three, comprising: a primary winding; a multiplicity of spaced ferromagnetic teeth; N secondary windings each of which embraces consecutive equal groups of the teeth in alternate sense, a first and a second of the secondary windings embracing pairs of the teeth, the pairings of the teeth for the first and second secondary windings being different, and the remaining $(N-2)$ secondary windings embracing groups of $2^R$ teeth, where R has different integral values from 2 to $(N-1)$ for the different ones of said $(N-2)$ windings; a ferromagnetic member that is mounted to move from one tooth to the next in response to variation in said relative position and to complete a magnetic circuit that inductively links the primary winding to those portions of the said N secondary windings that embrace whichever said tooth is in the locality of the ferromagnetic member; means to supply an excitation signal of varying amplitude to the primary winding; means responsive to difference in amplitude between signals induced in the first and second secondary windings respectively to supply the least significant of said N output signals, the digital value of the least significant signal being dependent upon which of the two induced signals has the larger amplitude; and means responsive to the signal induced in said first secondary winding and to signals induced in said $(N-2)$ secondary windings to supply the remaining $(N-1)$ output signals, the digital values of these $(N-1)$ output signals being dependent upon whichever of two phase relationships, in phase and in anti-phase, exists between the exciting signal and the last-mentioned induced signals respectively.

6. An electrical coding arrangement for supplying N binary-coded output signals that are together representative of the angular position of a shaft, where N is an integer larger than three, comprising: a ferromagnetic core having a multiplicity of angularly spaced ferromagnetic teeth; a primary winding carried by the core and arranged to be excited by an alternating current exciting signal; N secondary windings each of which embraces consecutive equal groups of the teeth in alternate sense, a first and a second of the secondary windings embracing pairs of the teeth, the pairings of the teeth for the first and second secondary windings being different, and the remaining $(N-2)$ secondary windings embracing groups of $2^R$ teeth, where R has different integral values from 2 to $(N-1)$ for the different ones of said $(N-2)$ windings; a ferromagnetic member that is mounted on the shaft to move from one tooth to the next and to complete a magnetic circuit that inductively links the primary winding to those portions of the said N secondary windings at the relevant tooth; means responsive to difference in amplitude between signals induced in the first and second secondary windings respectively to supply the least significant of said output signals, the digital value of the least significant signal being dependent upon which of the two induced signals has the larger amplitude; and means responsive to the signal induced in said first secondary winding and to signals induced in said $(N-2)$ secondary windings to supply the remaining $(N-1)$ output signals, the digital values of the other $(N-1)$ output signals being dependent upon whichever of two phase relationships, in phase and in anti-phase, exists between the exciting signal and the last-mentioned induced signals respectively.

7. In an electrical coding arrangement for providing an output that is in digital form and is representative, according to a digital code, of the magnitude of an input variable, the combination comprising: means to supply two electric signals which have amplitudes that are dependent upon the magnitude of the variable and that vary cyclically in response to variation in said magnitude through successive ranges of variation, the cycles of the two signals being the same but being differently phased with respect to one another within each range; and means to compare the amplitudes of the two signals and supply an output signal having an amplitude that is dependent upon the amplitudes relative one to the other of the two signals, the output signal thereby having an amplitude that varies with variation in the magnitude of said input variable in cycles corresponding to ranges of variation of said magnitude smaller than the first-mentioned ranges.

8. In an electrical coding arrangement for providing a plurality of binary-coded output signals that are together representative of the magnitude of an input variable, apparatus for supplying the least-significant of the output signals comprising: means to supply first and second electric signals having amplitudes that are dependent upon the magnitude of the input variable and that vary cyclically in phase-quadrature with one another through the successive ranges of variation of said magnitude; and means to compare with one another the amplitudes of said first and second signals and to supply an output electric signal the amplitude of which has one value when the amplitude of the first signal is larger than the amplitude of the second signal, and another value when the amplitude of the second signal is larger than the amplitude of the first signal.

References Cited by the Examiner

UNITED STATES PATENTS

| | | | |
|---|---|---|---|
| 2,894,256 | 7/59 | Kronacher | 340—347 |
| 2,980,900 | 4/61 | Rabin | 340—347 |
| 2,991,462 | 7/61 | Hose | 340—347 |

MALCOLM A. MORRISON, *Primary Examiner.*

STEPHEN W. CAPELLI, *Examiner.*